United States Patent Office 3,230,022
Patented Jan. 18, 1966

3,230,022
BEARING
Henry Znamirowski, Ellicott City, Md., assignor to Eastern Products Corporation, Baltimore, Md., a corporation of Maryland
Filed Dec. 14, 1962, Ser. No. 244,669
2 Claims. (Cl. 308—195)

The present invention relates to bearings and more particularly to bearings particularly suited for use in traverse rod assemblies and similar applications where low cost and long life are important considerations.

The principal object of the present invention has been the provision of a novel and improved bearing construction.

Another object of the invention has been the provision of a two piece bearing construction which may be used either with or without anti-friction bearing balls.

Still another object of the invention has been the provision of a novel and improved ball bearing construction which is inexpensive to manufacture and assemble.

Other and further objects, features and advantages of the invention will appear more fully from the following description taken in connection with the appended drawing in which.

Figure 3:
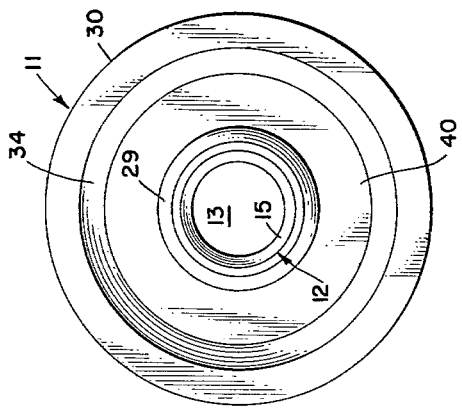
FIG. 3 is a rear elevational view of the pulley of FIGS. 1 and 2.

The bearing of the invention comprises an inner annular race member 10 and an outer annular race member 11. Inner member 10 has a generally cylindrical body 12 with a central bore 13 adapted to receive suitable supporting means. The outer ends of the body 12 are champfered to form annular shoulders 14 and 15, respectively, at the mouths of bore 13.

Figure 2:
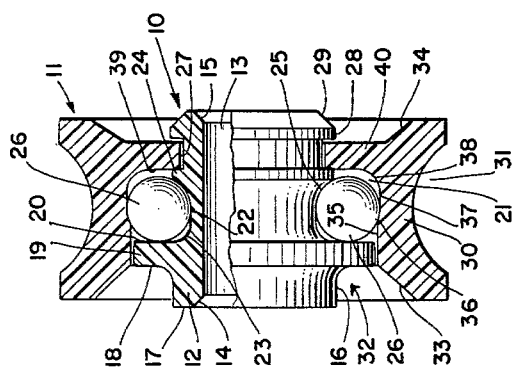
FIG. 2 is a side view, partly in cross section, taken along the line 2—2 of FIG. 1.
Figure 1:
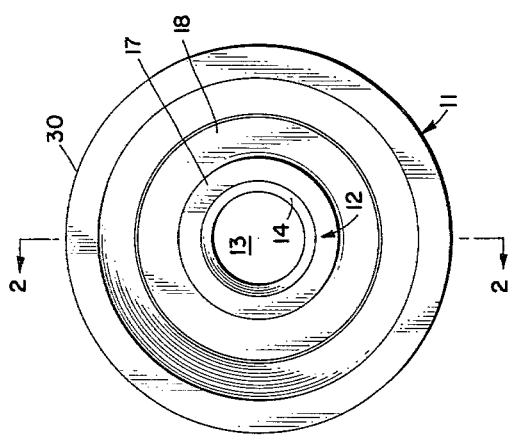
FIG. 1 is a front elevational view of a pulley embodying the invention.

The radially outer surface of body 12 has a horizontal surface 16 adjacent a vertical surface 17 which forms the left side of body 12 (FIG. 2). Surface 16 is rounded into adjacent side 18 of a radially extending narrow flange 19, a surface 20 of which forms one side wall of an annular raceway 21.

The surface 20 joins an annular horizontal surface 22 through a curved surface 23. Surface 22 in turn joins an adjacent radial flange 24 through a curved surface 25. Preferably the surface 23 is formed with a smaller radius than the surface 25. Typically, surface 23 might have a radius of 1/32" while surface 25 might have a radius of 0.063", for use with bearing balls of 1/8 inch diameter. It should be understood that the foregoing and other dimensions given herein are illustrative only.

The surfaces 20, 22, 23 and 25 form an annular inner raceway for a series of bearing balls 26. The axial extent of the inner raceway from surface 20 to the radially outer point of surface 25 might be equal to the ball diameter, while the radial height of the inner raceway from surface 22 to the radially outer point of surface 20 might be .113", i.e., slightly less than the ball diameter. The radial height of the inner raceway at the other end thereof, i.e., the height of flange 24 above surface 22, may be substantially less, e.g., about .035".

Axially beyond flange 24, body 12 is provided with an annular slot 27, one radial side wall of which is formed by a side wall of flange 24 and the other side wall of which is formed by a radially extending flange 28 which meets a champfered surface 29 forming the adjacent end of body 12.

Outer annular race member 11 is provided with a generally cylindrical body 30 which may be formed with the desired outer configuration, e.g., with an annular groove 31 in case the ball bearing assembly is to be used as a pulley. The body 30 has a central bore 32. The outer ends of body 30 are champfered to form annular shoulders 33 and 34 at the respective mouths of bore 32.

The shoulder 33, at the axially inner end thereof, joins a horizontal annular surface 35 which has a diameter only a few thousandths greater than the diameter of flange 19. For example, flange 19 might have a diameter of .480" while that portion of bore 32 bounded by surface 35 might have a diameter of .484". Surface 35 meets a curved annular surface 36 which in turn meets a horizontal annular surface 37. The surface 37 in turn meets a curved annular surface 38. The surface 36 may have the same radius and length as the surface 25 while the surface 38 may have the same radius and length as the surface 23.

Surface 38 joins a side surface 39 of an annular flange 40. Flange 40 projects into slot 27 and contact between the side walls of flange 40 and the side walls of slot 27 serves to retain the inner and outer race members 10 and 11 in assembled relationship. Typically, the internal diameter of slot 27 might be .265" while the diameter of bore 32 at flange 40 might be .270". The flanges 24 and 28 which form the side walls of slot 27 might have diameters of .312" and .296" respectively.

The race members 10 and 11 may be made from any of the resilient plastic materials having the self-lubricating qualities required for plastic bearing surfaces, e.g., nylon or Teflon.

In assembling the bearing, the inner race member 10 may be placed in a suitable holder with the desired number of bearing balls 26 in the raceway 21. The outer race member 11 is then snapped into position. Some slight force will be required to cause the surface 35 to pass over the balls, but the major force required in assembly will be in connection with forcing flange 40 into slot 27. The champfered nature of surface 29 facilitates the bending of flange 40 required during assembly. Also of assistance in this regard is the relatively long, thin nature of flange 40 and the relatively short height of the side walls of slot 27.

The race members 10 and 11 will be retained in assembled relationship without balls 26 and hence these balls may be omitted when it is desired to produce an even lower cost bearing for those applications where the lower cost out weighs the freer running characteristics of a ball bearing unit. In this connection, it will be observed that flange 19 and surface 35 form a pair of bearing surfaces as do flange 40 and the base of slot 27. Either with or without the balls, flange 40 and the side walls of slot 27 act as an annular thrust bearing.

While the invention has been described in connection with a specific embodiment thereof and in a specific use, various modifications thereof will occur to those skilled in the art without departing from the spirit and scope of the invention as set forth in the appended claims.

What is claimed is:

1. A bearing assembly; comprising an annular inner race member having a first anular flange projecting radially outwardly from the outer periphery of said inner race member adjacent one side thereof, a second annular flange projecting radially outwardly from the outer periphery of said inner race member at a point spaced axially inwardly of said first flange whereby said first and second flanges define an annular slot therebetween, and a third annular flange projecting radially outwardly from the outer periphery of said inner race member at a point spaced axially inwardly of said second flange, the facing surfaces of said second and third flanges and the outer peripheral surface of said inner race member therebetween defining one side of an annular raceway; and an annular outer race member concentric with said inner race member and having a fourth annular flange projecting radially inwardly from the inner periphery of said outer race member adjacent one side thereof, said fourth flange projecting into said annular slot substantially to the base of said slot to permit bearing contact between said fourth flange and the inner periphery of said slot, the diameter of the inner periphery of said outer race member radially opposite said third flange being substantially equal to the diameter of said third flange to permit bearing contact between said third flange and the inner periphery of said outer race members, said third flange contacting said outer race member only along the outer diameter of said third flange, the inner periphery of said outer race member between said third and fourth flanges defining the other side of said annular raceway; said annular raceway being adapted to receive and retain a plurality of bearing balls; said inner and outer race members being retained in assembled relationship by contact between the sides of said fourth flange and the facing sides of said first and second flanges; said inner and outer race members being formed of a flexible, resilient, self-lubricating plastic material.

2. A ball bearing assembly; comprising an annular inner race member having a first annular flange projecting radially outwardly from the outer periphery of said inner race member adjacent one side thereof, a second annular flange projecting radially outwardly from the outer periphery of said inner race member at a point spaced axially inwardly of said first flange whereby said first and second flanges define an annular slot therebetween, and a third annular flange projecting radially outwardly from the outer periphery of said inner race member at a point spaced axially inwardly of said second flange, the facing surfaces of said second and third flanges and the outer peripheral surface of said inner race member therebetween defining one side of an annular raceway; an annular outer race member concentric with said inner race member and having a fourth annular flange projecting radially inwardly from the inner periphery of said outer race member adjacent one side thereof, said fourth flange projecting into said annular slot to permit bearing contact between said fourth flange and the inner periphery of said slot substantially to the base of said slot, the diameter of the inner periphery of said outer race member radially opposite said third flange being substantially equal to the diameter of said third flange to permit bearing contact between said third flange and the inner periphery of said outer race member, said third flange contacting said outer race member only along the outer diameter of said third flange, the inner periphery of said outer race member between said third and fourth flanges defining the outer side of said annular raceway; and a plurality of bearing balls in said raceway; said inner and outer race members being retained in assembled relationship by contact between the sides of said fourth flange and the facing sides of said first and second flanges; said inner and outer race members being formed of a flexible, resilient, self-lubricating plastic material; said inner race member having a tapered nose adjacent said first flange to facilitate entry of said fourth flange into said slot when said inner and outer race members are disposed concentrically and are subjected to an axial force urging said race members together.

References Cited by the Examiner
UNITED STATES PATENTS

| | | | |
|---|---|---|---|
| 2,033,771 | 3/1936 | Leister | 308—195 |
| 2,757,054 | 7/1956 | Van De Warker. | |
| 2,805,107 | 9/1957 | Van De Warker | 308—190 |
| 2,913,284 | 11/1959 | Zankl. | |
| 2,995,405 | 8/1961 | Ferdig | 308—190 |
| 3,033,624 | 5/1962 | Biesecker. | |
| 3,034,839 | 5/1962 | Schoos | 308—190 X |
| 3,084,004 | 4/1963 | Henley | 308—195 X |
| 3,097,898 | 7/1963 | Ferdig | 308—190 |
| 3,105,725 | 10/1963 | Biesecker | 308—195 |

DON A. WAITE, *Primary Examiner.*

ROBERT C. RIORDON, FRANK R. SUSKO,
*Examiners.*

UNITED STATES PATENT OFFICE
CERTIFICATE OF CORRECTION

Patent No. 3,230,022　　　　　　　　　　　　　　January 18, 1966

Henry Znamirowski

It is hereby certified that error appears in the above numbered patent requiring correction and that the said Letters Patent should read as corrected below.

Column 3, line 10, for "members" read -- member --; column 4, lines 1 to 3, for "slot to permit bearing contact between said fourth flange and the inner periphery of said slot substantially to the base" read -- slot substantially to the base of said slot to permit bearing contact between said fourth flange and the inner periphery --; line 11, for "outer" read -- other --.

Signed and sealed this 20th day of December 1966.

(SEAL)
Attest:

ERNEST W. SWIDER
Attesting Officer

EDWARD J. BRENNER
Commissioner of Patents